United States Patent
Chou et al.

(10) Patent No.: US 7,183,736 B1
(45) Date of Patent: Feb. 27, 2007

(54) AC SERVO SYSTEM WITH DISTRIBUTED MOVEMENT CONTROL

(75) Inventors: Chung-Chi Chou, Taoyuan Hsien (TW); Jian-Da Chen, Taoyuan Hsien (TW); Chin-Shiong Tsai, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 11/341,470

(22) Filed: Jan. 30, 2006

(51) Int. Cl.
*G05B 19/33* (2006.01)

(52) U.S. Cl. .................. 318/575; 318/568.1; 318/574

(58) Field of Classification Search ............. 318/575, 318/568.1, 568.15, 568.19, 569, 574; 700/18, 700/180, 86
See application file for complete search history.

(56) References Cited

U.S. PATENT DOCUMENTS 6,442,442 B1 * 8/2002 Weinhofer .................. 700/86

* cited by examiner

*Primary Examiner*—Karen Masih (57) ABSTRACT

An AC servo system with distributed movement control is used for multiple axes control in distributed manner includes at least one drive containing a programmable movement controller to perform a customized procedure to control I/O signal of local axis or other axis. The drive can download/perform movement program through communication network, edit axis parameter and monitor the axis status. The drive can set to be master/slave axis according to practical need. The master axis drive performs multiple axes simultaneous control and sends path command to each slave axis drive. The master axis drive calculates complementary command coordinate according to the path command and the path command received by the slave axis drive, whereby the movement trace of the master/slave axis drive can satisfy the path command requirement.

15 Claims, 4 Drawing Sheets

AC SERVO SYSTEM WITH DISTRIBUTED MOVEMENT CONTROL

BACKGROUND OF THE INVENTION

1. Field of the Invention

The present invention relates to an AC servo system with a plurality of motor drives, wherein the motor drive is incorporated with a movement control unit for distributed movement control.

2. Description of Prior Art

The current multiple axes control architecture is centralized by an upper controller to control servo drive for linear/circular motion. The current multiple axes control architecture is demonstrated hereinafter with conventional wiring or high speed communication.

Figure 1:
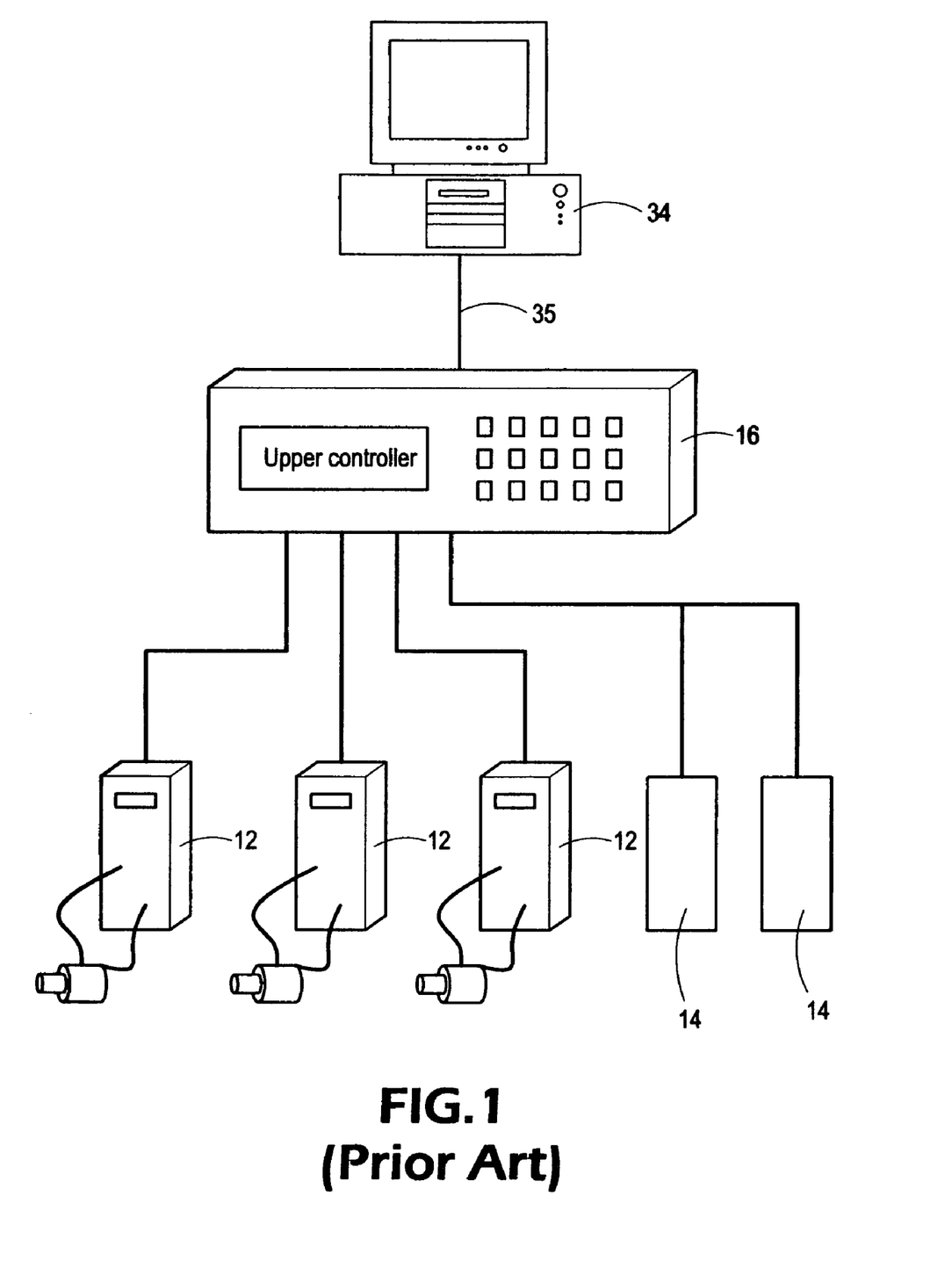
FIG. 1 shows a schematic diagram of a prior art centralized control system for multiple axes control.

FIG. 1 shows a schematic diagram of a prior art centralized control system for multiple axes control. The command and I/O 14 control of the multiple axes interpolation for the servo drive 12 is dealt by the upper controller 16. The signal from each axis is connected to the servo drive 12 through conventional wiring. However, the above scheme has following advantages:

1. High cost: The performance of the upper controller 16 is demanding for more axes. The CPU (now shown) of the upper controller 16 is also requested with higher grade.

2. Limited axes number: The axes number of the servo drive 12 is limited by CPU grade and hardware channel number.

3. Complicated wiring: There are complicated wiring of A/D, D/A, command pulse, feedback pulse, digital I/O signals between upper controller 16 and servo drive 12.

4. Insufficient resolution: The command signal is limited by physical signals such as A/D conversion resolution and pulse frequency.

5. Environment interference: The analog signal tends to be interfered in factory environment.

6. Maintenance problem: The wires are more complicated when the axes number of the servo drive 12 is large. The inspection and maintenance are troublesome.

Figure 2:
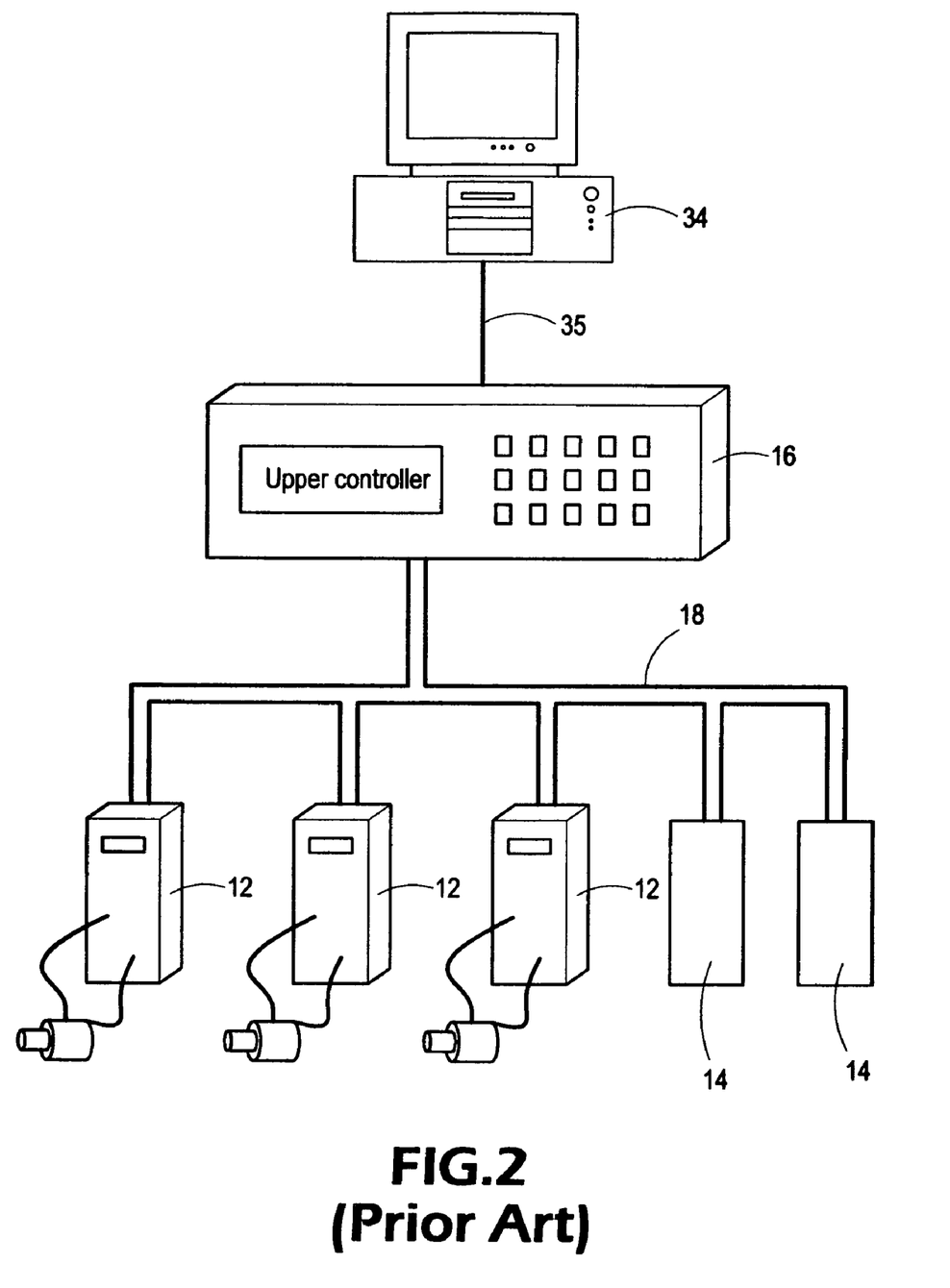
FIG. 2 shows the schematic diagram of a prior art control system for multiple axes control with high speed communication.

FIG. 2 shows the schematic diagram of a prior art control system for multiple axes control with high speed communication, where the wire between the upper controller 16 and servo drive 12 in FIG. 1 is replaced by a high speed communication network 18. The high speed communication network 18 has simple wiring and can prevent interference and enhance resolution. The servo drive 12 does not have interpolation ability for path commands such that the upper controller 16 needs to send intense interpolation commands (more than 1 KHz) to each axis to achieve path denseness. However, the network is also used for sending feedback position, current and I/O status besides position and speed commands. The data throughput is high when the axes number is high and the status of each axis needs monitoring. The bandwidth of the high speed communication network 18 needs at least 10 MHz, which induces following results.

1. Higher cost: High speed communication is more sensitive to noise and high-standard communication hardware such as optical fiber is needed in factory environment.

2. Special specification: The high speed communication network 18 involves specialized industry standard such as SSC-Netand Sercos. The system generally is purchased in package and it is difficult to be tailored by customers.

SUMMARY OF THE INVENTION

The present invention is intended to provide an AC servo system with distributed movement control. The AC servo system comprises a plurality of servo drives to provide a flat architecture. The movement interpolation can be calculated by each axis to reduce network loading. Standard industrial network can be used to reduced cost and the axis augmentation is easy.

Accordingly, the present invention provides an AC servo system with distributed movement control providing multiple axes control for movement. The AC servo system comprises a communication network; a master axis drive connected to the communication network; a master axis motor connected to the master axis drive; a plurality of slave axis drives connected to the communication network; a plurality of slave axis motors connected to the slave axis drives; personal computer or man-machine interface connected to one of the drives; wherein the master axis drive and the slave axis drives can program movement control/logic control procedure and set operation parameter for each of the axis drives in order to control movement of local/remote motor and I/O signal, wherein the master axis drive performs the movement control procedure to send a path command to the communication network; wherein the master axis drive calculates interpolation command for axis according to the path command and the slave axis drives calculates interpolation command for axis according to the path command sent through the communication network, whereby the master axis motor and the slave axis motors are driven according to the path command and the operation parameters.

Accordingly, the present invention provides a method for operating AC servo system with distributed movement control and controlling multiple axes. This method comprises steps of programming a movement control procedure for a master axis drive and a plurality of slave axis drives; setting operational parameters for each axis drive; the master axis drive performing the movement control procedure for sending a path command to the communication network; calculating command for each axis drive according to the path command; driving a master axis motor and a plurality of slave axis motors according to the command and the operational parameters; and performing the movement control procedure for controlling local axis or remote axis motor and I/O signals.

Accordingly, the present invention provides an AC servo system with distributed movement control providing multiple axes control for movement. The AC servo system comprises a communication network; a master axis drive and a plurality of slave axis drives connected to the communication network; a master axis motor connected to the master axis drive; a plurality of slave axis motors connected to the slave axis drives; personal computer or man-machine interface connected to one of the drives; wherein each of the master axis drive and slave axis drives comprises a servo drive assembly. The servo drive assembly comprises a communication unit connected to the communication network and connected to the personal computer or man-machine interface; a system parameter and variable unit providing communication to each unit in the servo drive assembly and storing the operation parameters; wherein the personal computer or man-machine interface sets/edits operation parameters stored in the system parameter and variable unit through the transmission wire and the communication unit, an I/O unit for setting I/O status according to the logic control procedure and storing the I/O status in the system parameter and variable unit; a movement control unit for performing the logic control procedure to set I/O of the I/O unit, performing the movement control procedure to control local/remote motor, the movement control unit downloads a movement program through the communication network and the communication unit, the movement program being performed to generate path command, the movement control unit calculating interpolation point for each sampling time according to the operation parameters and storing the interpolation point to a movement command area of the system parameter and variable unit; and a drive control loop unit for driving the motor of each axis according to the interpolation point and the operation parameters stored in the system parameter and variable unit.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 3:
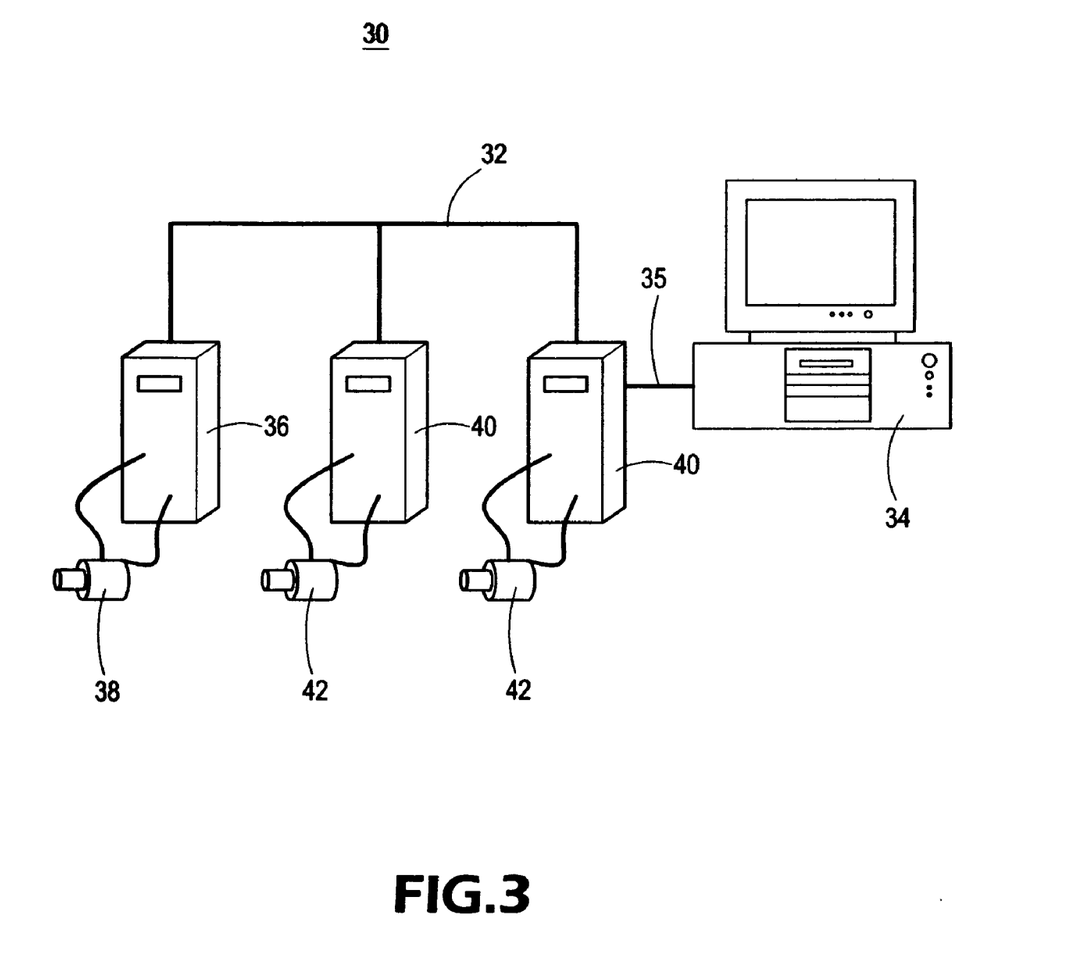
FIG. 3 shows a schematic diagram of an AC servo system with distributed movement control for multiple axes according the present invention.

FIG. 3 shows a schematic diagram of an AC servo system with distributed movement control for multiple axes according the present invention. As shown in this figure, the distributed type multiple axes control system 30 is operated for multiple axes control and comprises a communication network 32, a master axis drive 36 coupled to the communication network 32, a master axis motor 38 coupled to the master axis drive 36, a plurality of slave axis drives 40 coupled to the communication network 32, a plurality of slave axis motors 42 coupled to the slave axis drives 40, a personal computer (PC) or man-machine interface 34 is coupled to any one of the drives through a transmission line 35. The communication network 32 is composed of a CAN bus. The master axis motor 38 and the slave axis motors 42 are AC servo motors.

The master axis drive 36 and the slave axis drives 40 can be coded with a software control procedure to set the operational parameters for the axis drives. The master axis drive 36 and the slave axis drives 40 performs the corresponding procedures to control the movement of the motor for itself or for others (such as the master axis motor 38 and the slave axis motors 42) and IO signals. The master axis drive 36 and the slave axis drives 40 download movement program and set/edit parameter values through the personal computer (PC) or man-machine interface 34. The master axis drive 36 performs the movement program to send a path command through the communication network 32. The master axis drive 36 calculates the interpolation commands according to path commands and the slave axis drives 40 calculates the interpolation commands according to the path commands sent through the communication network 32. The master axis motor 38 and the slave axis motors 42 can be controlled through the path commands and set parameters of the master axis drive 36 and the slave axis drives 40. The status monitoring of each axis can be conducted by the personal computer (PC) or man-machine interface 34 through the communication network 32.

Figure 4:
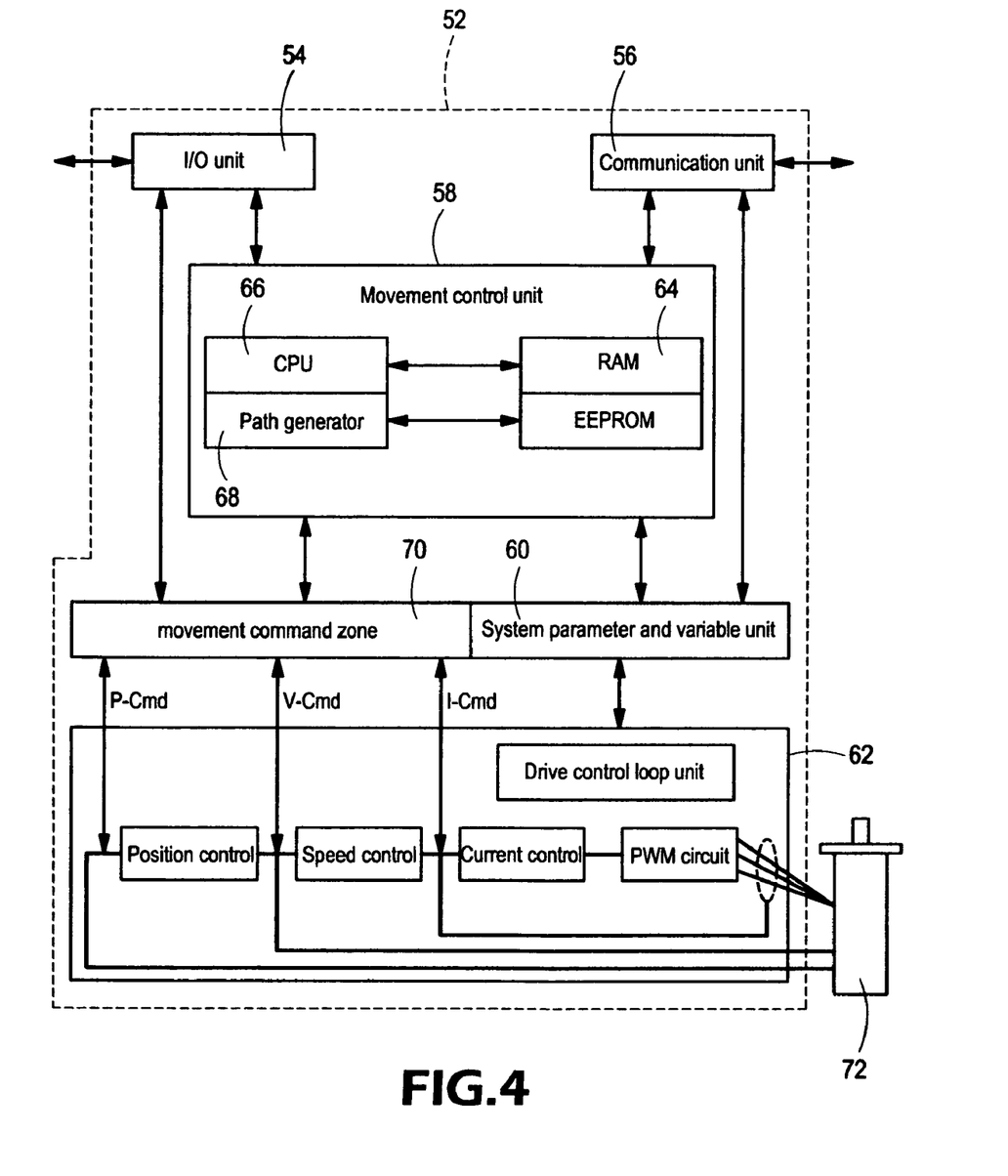
FIG. 4 shows the block diagram of drive.

In FIG. 3, each of the master axis drive 36 and the slave axis drives 40 comprises a servo drive assembly 52. FIG. 4 shows the block diagram of the drive. As shown in this figure, the servo drive assembly 52 comprises an I/O unit 54, a communication unit 56, a movement control unit 58, a system parameter and variable unit 60 and a drive control loop unit 62.

The I/O unit 54 comprises digital I/O and analog I/O and is set by the movement control unit 58. The I/O signals are processed by the movement control unit 58 and the status of the I/O is placed in the system parameter and variable unit 60 for the reference of other units.

The communication unit 56 comprises three buses, namely USB/RS-232(485)/CAN, (not shown). The USB bus and the RS-232(485) bus are connected to the personal computer (PC) or man-machine interface 34 through the transmission line 35 for the parameter set/edit and program download of the servo drive assembly 52. The USB bus and the RS-232(485) bus can also be used for monitoring the operation status of each axis. The CAN bus is used for sending master/slave axis path command and data exchange between axes.

| | Station number (8 bits) | |
|---|---|---|
| Name | group number (4 bit) | Axis number (4 bit) |
| Range | 0–F | 0–F |

The station number is of 8 bits and is separated into 16 groups (4 bit), where each group comprises 16 axes (4 bits) and the axis with axis number=0 is master axis and remaining axes are slave axes. However, above description is used for demonstration and the number of axes for the present invention is not limited to above example. The axes in the same group can perform multiple axes interpolation movement. The slave axis performs the interpolation when the master axis issues the interpolation commands. The slave axis not performing interpolation can also perform movement command for single axis. Provided that N groups of multiple axes in a system need simultaneous movement, namely N units of X-Y Tables, the multiple axes can be allocated to N groups. The CAN bus for each group can be connected together or individually.

The movement control unit 58 is used for performing movement program to generate program path for the command input of the drive control loop unit 62. The movement program is downloaded to the RAM 64 of the movement control unit 58 through the communication unit 56. The movement program comprises code and data. The CPU 66 in the movement control unit 58 provides programmable logic control (PLC) commands such as LD/AND/OR/OUT beside operation commands. The movement control unit 58 has multi-tasking such that the PLC procedure can be written into some tasks. The movement control and sequential control can be done in multi-tasking manner. The path generator 68 in the movement control unit 58 calculates the interpolation point for each sampling time according to the operation mode (position/speed/torque) and movement path (speed/point to point/linear motion/circular motion) and stores the interpolation point for each sampling time to the movement command zone 70 of the system parameter and variable unit 60. The drive control loop unit 62 uses corresponding commands in the movement command zone 70 such as position command P-Cmd, speed command V-cmd and current command I-cmd to control actual movement of a servo motor 72. In the master axis, the command of the path generator 68 is assigned by the path command in the master axis drive 36 and the slave axis get the command sent from the master axis drive 36 through CAN bus.

The system parameter and variable unit 60 stores public information in the system and bridges other units. The public information includes operation mode (position/speed/torque), axial parameter (encoder resolution), axial status (current position/speed), path parameter (acceleration time/target speed), motion command (position/speed/torque), DI/O mode (AB contact in relay/local machine/remote control), communication parameter (Baud rate/station number). The public information can be accessed by the personal computer 34 through the communication unit 56 and the transmission line 35.

The skilled in the related art should know that the drive control loop unit 62 actually controls the function of the servo motor 72. The drive control loop unit 62 comprises position/speed/torque (current) circuit, command smooth filter, shock suppressor, PWM output, and the gain parameter of each circuit is defined in the system parameter and variable unit 60.

To sum up, the motion drive of the present invention has following features:

(A) Programmable: The motion drive of the present invention has motion and logic control procedure because the upper control is saved.

(1) The motion program is edited and compiled in PC external to the motion drive and downloaded by the communication unit of the motion drive to the RAM 64 of the movement control unit 58.

(2) The execution and stop of the motion program is set by system parameters and variables, which can be set through display panel or the personal computer (PC) or man-machine interface 34.

(3) The movement program after test is recorded in the EEPROM of the movement control unit 58 for stand-alone operation.

(4) The movement status can be sent to external PC through the communication unit 56 for debug.

(b) Multiple axes interpolation: one group contains a master axis and a plurality of slave axes. The axes in the same group can perform interpolation such as linear/circular interpolation. The axes achieve simultaneous timing through communication network. The multiple axes interpolation has following procedure:

(1) Setting interpolation parameters: The movement program of the master axis performs interpolation program to select interpolation axis/setting interpolation target speed/acceleration and deceleration time for sending to the slave axes through the communication unit 56.

(2) Setting interpolation commands: The movement program of the master axis performs linear command (multiple axes position) or circular command (radius/angle) for sending to the slave axes through the communication unit 56.

(3) The interpolation for each axis: Each axis (master axis or slave axis) obtains its own interpolation command and refers to the parameter of (1). The path generator calculates the interpolation command for each sampling time and store in the movement command area of the system parameter and variable unit.

(4) The control loop unit 62 of each axis reads the command of movement command zone 70 and control the status of servo motor actually.

(c) The flowchart of I/O operation of the local axis and other axis (1) The source of the DO (digital output) in the system parameter and variable selects DO of local axis as the output of the local axis. Other DO of local axis provide remote output for other axis. The DI (digital input) of local axis can be read by local axis or other axis remotely.

(2) The remote output axis of other DO of local axis is selected by DO position selection in the system parameter and variable unit 60.

(3) DO output procedure for local axis and other axis: The movement program is activated (PLC procedure) and the local DO status is written to the system parameter and variable unit 60.

(4) DO output procedure for other axis: The local axis reads DO message from communication unit 56 and the remote DO status is written to the system parameter and variable unit 60.

(5) Final DO output procedure for local axis: The I/O unit 54 of the local axis screens out the unwanted DO in (3), (4) according to DO source selection and merges other DO in (3), (4) to obtain the final DO output.

(6) Remote DO output procedure: The I/O unit 54 of the local axis reads the DO status of the system parameter and variable unit 60 according to DO location and finds the local axis DO to be sent to other axis and sends the DO status through communication unit.

The features of the present invention includes following:

(1) Reducing CPU load with distributed control: In multiple axes control, the interpolation command is calculated by each axis and the user program can be divided into a plurality of small programs into each axis for respective movement procedure. The program is compact and modularized. The program can be distributed to each axis and the CPU load can be reduced.

(2) Instant data exchange through communication network: The data exchange can be provided for different axes through communication network, and simultaneous motion for multiple axes (linear/circular interpolation) can be realized. The network can provides priority and instant property and data exchange will not influence simultaneous motion for multiple axes. The I/O signal can be read through communication network for remote I/O. The available I/O number is increased when axes number is increased, and the existing resource can be fully exploited.

(3) Built-in full-function movement controller and PLC: The movement controller is built in driver. The wiring for external pulse and analog command is not needed. High precise and high speed can be achieved and the assemble time is reduced. In conventional system, the resolution of encoder should be refined (17–23 bit) for high precision. The command speed is reduced when the pulse frequency is not fast. The clamping precision will be degraded when the electronic wheel has multiple speeds. For analog command, the general A/D conversion in driver has 12-bit resolution. However, the general A/D conversion in driver has noise and shift problem. The problem can be solved and the command resolution can be enhanced to 32 bit when the movement controller is built in the driver.

(4) Customizable/programmable: The user can define the operation of the drive according to his need. The user has flexibility to define the function of DI/DO signal, analog I/O function, operation parameter, pulse command usage. For example, the analog input 1 (originally the speed command) can be adapted to rigidity of controller or the pulse input can be adapted into hand wheel input or optical meter input. The existing resource can be fully exploited and extra signal conversion interface is not needed.

(5) Network development environment: In conventional multiplex development environment, the set parameter for axis and machine tuning should be performed on site. In the present invention, the axis is connected communication network and any axis can be treated with parameter setting, program editing, program execution, program debugging and monitoring as long as the axis is connected to communication network.

Moreover, the present invention has following advantages:

(1) Distributed calculation: The path calculation is distributed to each axis and the number of axes will not affect work load of CPU.

(2) Easy augmentation of axes: Only servo drive is needed to add in distributed architecture.

(3) Programmable: The drive already contains movement controller and PLC and user can program the movement procedure and logic control procedure.

(4) Customizable: The interface can be freely programmed to satisfy system integration need.

(5) Modularize: The movement program is performed in each axis for providing a module.

(6) High precision: The upper controller can be integrated with drive and no physical line is needed for sending command. The command precision and reliability is enhanced. The cost, effort, space, wiring can be saved.

(7) Saving wiring: The conventional is replaced by communication network for simplicity.

(8) Saving I/O: The communication signal (such as SrvOn-Ready-Alarm-PosOK-ClrCnt) between the upper controller and the drive is no longer needed and the spare I/O can be used for PLC procedure. The remote I/O can be provided by using advantage (7) when axes and I/O number are high.

(9) Noise resistance: The communication network (standard industrial network) has high noise resistance because no analog command is involved.

(10) High reliability: Backup system is provided for malfunction condition.

(11) Network development environment: One to multiple connection is benefic to system development.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An AC servo system with distributed movement control providing multiple axes control for movement, the system comprising:
   a communication network;
   a master axis drive connected to the communication network;
   a master axis motor connected to the master axis drive;
   a plurality of slave axis drives connected to the communication network;
   a plurality of slave axis motors connected to the slave axis drives; and
   a personal computer or a man-machine interface connected to one of the drives;
   wherein the master axis drive and the slave axis drives can program movement control/logic control procedure and set operation parameter for each of the axis drives in order to control movement of local/remote motor and I/O signal,
   wherein the master axis drive performs the movement control procedure to send a path command to the communication network, and
   wherein the master axis drive calculates interpolation command for axis according to the path command and the slave axis drives calculates interpolation command for axis according to the path command sent through the communication network, whereby the master axis motor and the slave axis motors are driven according to the path command and the operation parameters.

2. The AC servo system as in claim 1, wherein the personal computer or man-machine interface downloads movement control procedure and set/edit operation parameters through a transmission wire and the communication network, and monitors an operation status of each axis motor.

3. The AC servo system as in claim 1, wherein each of the master axis drive and slave axis drives comprises a servo drive assembly, and the servo drive assembly comprises:
   a communication unit connected to the communication network and connected to the personal computer or man-machine interface;
   a system parameter and variable unit providing communication to each unit in the servo drive assembly and storing the operation parameters; wherein the personal computer or man-machine interface sets/edits operation parameters stored in the system parameter and variable unit through the transmission wire and the communication unit,
   an I/O unit for setting I/O status according to the logic control procedure and storing the I/O status in the system parameter and variable unit;
   a movement control unit for performing the logic control procedure to set I/O of the I/O unit, performing the movement control procedure to control local/remote motor, the movement control unit downloads a movement program through the communication network and the communication unit, the movement program being performed to generate path command, the movement control unit calculating interpolation point for each sampling time according to the operation parameters and storing the interpolation point to a movement command area of the system parameter and variable unit; and
   a drive control loop unit for driving the motor of each axis according to the interpolation point and the operation parameters stored in the system parameter and variable unit.

4. The AC servo system as in claim 3, wherein the operation parameters stored in the system parameter and variable unit comprises an operation mode, axial parameter, axial status, path parameter, digital I/O mode, and a communication parameter.

5. The AC servo system as in claim 3, wherein the movement control unit comprises, a RAM, an EEPROM, a CPU and a path generator, the RAM stores the downloaded movement program, the CPU provides a group of PLC command to program the logic control procedure, the CPU performs the movement program to generate a command for using as an input command for the path generator, the path generator calculates the interpolation point for each sampling time and stores the interpolation point to the movement command area of the system parameter and variable unit.

6. The AC servo system as in claim 1, wherein the communication network comprises a USB bus, an RS232 (485) bus and a CAN bus.

7. The AC servo system as in claim 1, wherein the master axis motor and the slave axis motor are AC servo motor.

8. A method for operating AC servo system with distributed movement control and controlling multiple axes, comprising
programming a movement control procedure for a master axis drive and a plurality of slave axis drives;
setting operational parameters for each axis drive
the master axis drive performing the movement control procedure for sending a path command to the communication network;
calculating command for each axis drive according to the path command;
driving a master axis motor and a plurality of slave axis motors according to the command and the operational parameters; and
performing the movement control procedure for controlling local axis or remote axis motor and I/O signals.

9. The method as in claim 8, further comprising
a personal computer or a man-machine interface downloading the movement control procedure for the master axis drive and the slave axis drives and setting/editing the operational parameters through a communication network;
the personal computer or a man-machine interface monitoring operation status of each axis motor through the communication network and a transmission line connected to any axis drive.

10. The method as in claim 8, wherein the master axis drive and the slave axis drives comprises a servo drive assembly, and the method further comprises:
providing a system parameter and variable unit to store the operation parameters and communicate for units in the servo drive assembly;
the personal computer or a man-machine interface setting/editing the operation parameters in the system parameter and variable unit of local axis through the transmission line and the communication unit; or setting/editing the operation parameters in the system parameter and variable unit of remote axis through the communication unit;
a movement control unit for performing a logic control procedure to set I/O status of an I/O unit and storing the I/O status in the system parameter and variable unit;
the movement control unit of the master axis performing the movement control procedure for generating a command for movement path and calculating interpolation point for each sampling time according to the operation parameters and storing the interpolation point to a movement command area of the system parameter and variable unit; and
the movement control unit performing the movement control procedure to control local/remote motor and I/O signal; and
a drive control loop unit for driving the motor of each axis according to the interpolation point and the operation parameters stored in the system parameter and variable unit.

11. The method as in claim 10, further comprising:
storing the downloaded movement control procedure to a RAM;
a CPU providing a group of PLC commands to program the logic control procedure;
the CPU of master axis performing the movement control procedure in the RAM to generate a command for generating movement path and used as input for a path generator; and
the path generator calculating interpolation point for each sampling time according to the operation parameters and storing the interpolation point to the movement command area of the system parameter and variable unit.

12. The method as in claim 8, wherein the step of setting I/O of each axis drive further comprises:
a) selecting part of digital out (DO) of local axis as the output of the local axis, providing other DO of local axis to other axis, setting all of digital input (DI) of local axis be readable by local axis or other axis remotely;
b) setting one of other axes for outputting other DO of local axis;
c) performing the movement control procedure to record DO of local axis in system parameters;
d) the local axis reading DO message from the communication network and the remote DO status being written to the system parameter.
e) screening out unwanted bits in (c) and (d) based on (a) and merging other bits in (c) and (d) to obtain the final DO output;
f) reading the DO status of the system parameter according to DO location and finding the local axis DO to be sent to other axis and sending the DO status.

13. An AC servo system with distributed movement control providing multiple axes control for movement and comprising: a communication network; a master axis drive and a plurality of slave axis drives connected to the communication network; a master axis motor connected to the master axis drive; a plurality of slave axis motors connected to the slave axis drives; personal computer or man-machine interface connected to one of the drives;
wherein each of the master axis drive and slave axis drives comprises a servo drive assembly, and the servo drive assembly comprising
a communication unit connected to the communication network and connected to the personal computer or man-machine interface;
a system parameter and variable unit providing communication to each unit in the servo drive assembly and storing the operation parameters; wherein the personal computer or man-machine interface sets/edits operation parameters stored in the system parameter and variable unit through the transmission wire and the communication unit,
an I/O unit for setting I/O status according to the logic control procedure and storing the I/O status in the system parameter and variable unit;
a movement control unit for performing the logic control procedure to set I/O of the I/O unit, performing the movement control procedure to control local/remote motor, the movement control unit downloads a movement program through the communication network and the communication unit, the movement program being performed to generate path command, the movement control unit calculating interpolation point for each sampling time according to the operation parameters and storing the interpolation point to a movement command area of the system parameter and variable unit; and a drive control loop unit for driving the motor of each axis according to the interpolation point and the operation parameters stored in the system parameter and variable unit.

14. The AC servo system as in claim 13, wherein the operation parameters stored in the system parameter and variable unit comprises an operation mode, axial parameter, axial status, path parameter, digital I/O mode, a monitor path and a communication parameter.

15. The AC servo system as in claim 13, wherein the movement control unit comprises, a RAM, an EEPROM, a CPU and a path generator, the RAM stores the downloaded movement program, the CPU provides a group of PLC command to program the logic control procedure, the CPU performs the movement program to generate a command for using as an input command for the path generator, the path generator calculates the interpolation point for each sampling time and stores the interpolation point to the movement command area of the system parameter and variable unit.

* * * * *